Patented Dec. 31, 1940

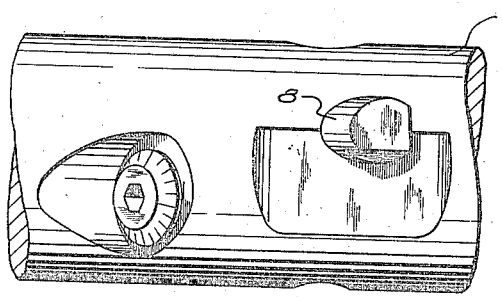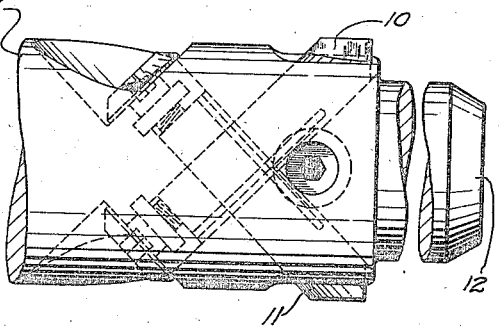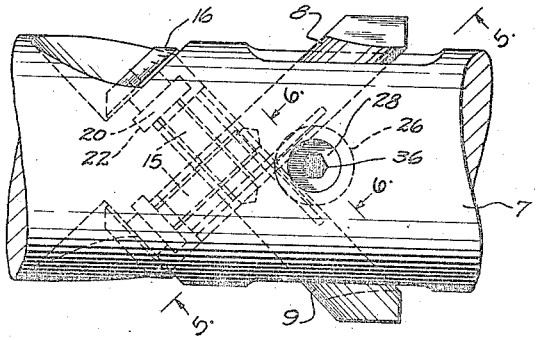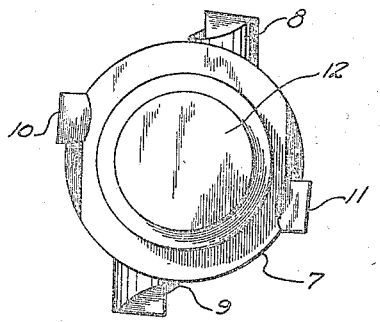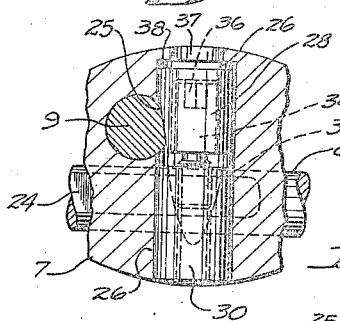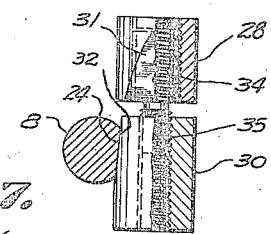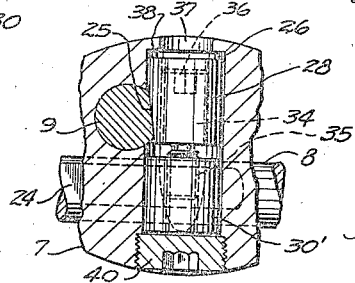

2,227,085

UNITED STATES PATENT OFFICE 2,227,085

CUTTING TOOL AND ANCHORAGE MEANS THEREFOR

Edward Hassig, Milwaukee, Wis., assignor to Wetmore Reamer Company, Milwaukee, Wis., a corporation of Wisconsin Application April 23, 1938, Serial No. 203,776

6 Claims. (Cl. 77—58)

This invention relates to improvements in cutting tools and anchorage means therefor.

In general, the cutting tool with reference to which this invention is disclosed, is somewhat similar to the tool disclosed in my Patent No. 2,096,489 granted October 19, 1937. In the present device it is my purpose to provide a novel and improved means for guiding and locking one or more cutting tools and, in particular, to provide a multiple wedge lock so organized with reference to the tool body and the tool elements therein mounted, as to permit of the independent release and adjustment of one of such elements.

Other objects will appear in more detail from the following disclosure.

In the drawing:

Figure 1 is a view in side elevation of an intermediate portion of a tool such as a boring bar, embodying this invention.

Figure 2 is a view of the end portion of the same tool.

Figure 3 is a view of that intermediate portion of the tool shown in Figure 1 as it appears when rotated 90 degrees.

Figure 4 is an end elevation of the composite tool.

Figure 5 is a detail fragmentary view taken in section on the line 5—5 of Figure 3.

Figure 6 is a detail view of the wedge lock construction taken at right angles to the plane of Figure 5.

Figure 7 is a view similar to Figure 5 showing a modified embodiment of the invention.

Like parts are identified by the same reference characters throughout the several views.

The use of the invention in connection with a boring bar represents merely an exemplification. The boring bar comprises the tool body 7 in which the several tool elements 8, 9, 10 and 11 are mounted in diagonal bores offset to avoid intersection. The cutting edges of tool elements 10 and 11 are adjusted to a lesser radius from the axis of the pilot 12 than are the cutting edges of the tool elements 8 and 9, thus enabling a plurality of cuts to be made in one traverse of the work.

The reciprocable adjustment of each of the two elements may conveniently be made in the manner disclosed in my application signed of even date and entitled "Cutting tools," or it may be made in the manner specifically disclosed in my aforesaid Patent No. 2,096,489, the latter arrangement being shown in the drawing. In dotted lines I have indicated the adjusting screw 15 in threaded connection with a tapped opening offset laterally from the center line of each of the tool elements. Each adjusting screw has a head provided with a dial at 16 and with an annular flange at 20 seated in a channel 22 which is concentric with the screw but is offset from the axis of the bore in which the tool element is reciprocable so that when the parts are assembled the interlocking engagement of the head flange 20 with the channel 22 in the tool body restrains the screw against axial movement, thereby enabling its rotative position to determine with accuracy the radial projection of the tool element from the body.

Each of the tool elements is preferably restrained against rotation in the assembly illustrated, and each is also preferably provided with means other than the adjusting screw for locking it in position during use. In accordance with the present invention each pair of cutting elements which operates together is provided with a single wedge lock for performing these functions, and the arrangement is such that when the lock is tight it firmly wedges both tool elements, the initial release of the lock being effective to release one of the elements, and the subsequent releasing operation thereof being effective to release the other.

Taking the tool elements 8 and 9 as an example, it will be noted from Figs. 5 and 6 that the tool element 8 is provided with a flattened surface at 24, while tool element 9 is provided with a flattened surface at 25. A transverse bore 26 intersects a portion of each of the bores in which the tool elements 8 and 9 are disposed, the transverse bore 26 being preferably disposed in the angle between the diagonally disposed tool elements 8 and 9, as shown in Fig. 3.

Within the transverse bore 26 are the wedges 28 and 30. Each wedge is generally cylindrical in form but each has a flattened wedge face, the face 31 of wedge 28 being complementary to the flat face 25 of the tool element 9, and the face 32 of wedge element 30 being complementary to the flattened surface 24 of the tool element 8. A single screw having threads of differing pitch is used to manipulate the tool wedge elements 28 and 30.

In this particular instance the threaded screw portion 34 disposed within wedge element 28 has a pitch which is opposite to the threaded portion 35 of said screw which is engaged in wedge element 30. The screw is socketed at 36 to receive a wrench for its manipulation. The socketed end of the screw is accessible through the reduced bore 37 which communicates at shoulder 38 with the bore 26 in which the wedges 28 and 30 are operable. The spacing of wedge 28 from shoulder 38 is an advantageous feature of the arrangement.

Either by slightly varying the pitch of the wedging surfaces of the respective wedges 28 and 30, or by using materials of differing coefficients of friction, the wedges are so made that one of them is more easily releasable from wedge engagement than the other. In this instance the wedge 28 is made to release tool element 9 before wedge 30 releases tool element 8. The two wedges and the control screw float as a unit in bore 26 so that after the wedges have been tightened upon the two tool elements the rotation of the screw in a wedge releasing direction might disengage either of the wedges, more or less as a matter of chance, were it not for the above described provision of means for assuring the primary release of wedge 28.

The first partial turn of the screw, therefore, will release the tool element 9 for adjustment, while tool element 8 will remain firmly locked in place. In the continued rotation of the screw, however, the wedge 28 will abut shoulder 38 at the end of the larger portion of bore 26, thereby precluding further movement of wedge 28 from its associated tool element 9. Thus, any continued rotation of the screw will necessarily effect a disengagement of wedge element 30 from tool element 8.

Those skilled in the art will appreciate that the above described arrangement is an important advantage in any tool in which two or more cutters are held by a single clamping device. The operation of setting up this tool for use may be as follows:

Taking cutters 8 and 9 by way of example, the cutters are assembled in the boring bar or tool body with the wedge lock released to permit free manipulation of the cutters. Without regard to the adjustment of cutter 9, the cutter 8 is accurately fixed at the proper radial projection and is held in its predetermined position until the wedge lock can be tightened. The slightly reduced angle or bevel of the wedging surface of wedge 30 increases the friction between this wedge and the adjusted cutter 8 as compared with the friction between wedge 28 and the unadjusted cutter 9 as the wedge lock is drawn up into clamping engagement with the respective cutters. As soon as the wedge lock is tight it is then released by a partial turn of the screw. Because of the increased friction at wedge 30, this wedge will remain tight and the releasing action of the screw will displace wedge 28 from cutter 9. Thereupon this cutter may be adjusted to the identical radius of cutter 8 (if that be desired), and then the wedge lock may again be tightened to securely fix the adjusted position of cutter 9, as well as that of cutter 8. It will frequently happen that any wear occasioned in the use of the tool may require only the readjustment of one of the cutters, and if the cutter which requires adjustment happens to be cutter 9, it is not necessary to release cutter 8 at all, even though the two cutters are held by a single wedge lock.

Figure 7 shows a construction which may be used where the angle or bevel of the wedging surfaces is the same. The wedge 30' in the Fig. 7 construction has been somewhat shortened and a screw plug 40 has been threaded into the tool body 7 behind it, thus providing for wedge 30' an abutment similar to that provided by shoulder 38 for wedge 28. Thus, in this construction, it is immaterial which of the wedges is first to release. It will in either case strike a fixed abutment so that the continued rotation of the screw in a releasing direction will effect the disengagement of the other wedge.

I claim:

1. In a boring tool the combination with a plurality of adjustable elements, of a body having means guiding said elements for adjustment and having a transverse guide means intersecting said first mentioned guide means, opposed wedges mounted in said transverse guide means in positions for opposite engagement with said elements, and means comprising a screw having threaded portions of differing pitch engaging the respective wedges and operable to force said wedges into clamping engagement with the respective elements, whereby to secure them in their respective guide means.

2. In a device of the character described, the combination with a plurality of adjustable elements, of a body provided with offset angularly related bores in which said elements are respectively reciprocable, said body having a transverse bore in the angle between said first mentioned bores, clamping parts floated in said transverse bore and oppositely engageable with the respective elements, and a screw including threaded portions of differing pitch in threaded connection with the respective clamping parts, whereby to connect said parts to float as a unit in said transverse bore for clamping engagement on manipulation of said screw with the respective elements.

3. In a device of the character described, the combination with a plurality of elements in a body providing guide means wherein said elements are adjustable, of wedges engaged with the respective elements, said body providing separate guide means for said wedges, and screw means for adjusting said wedges with respect to each other toward clamping engagement with the respective elements, one of said wedges having means providing a higher frictional binding contact with the element engaged thereby than is provided by another of said wedges whereby, on release of said screw means, said other wedge will be first disengaged.

4. In a device of the character described, the combination with a plurality of elements in a body providing guide means wherein said elements are adjustable, of wedges engaged with the respective elements, said body providing separate guide means for said wedges, and screw means for adjusting said wedges with respect to each other toward clamping engagement with the respective elements, one of said wedges having means providing a higher frictional binding contact with the element engaged thereby than is provided by another of said wedges whereby, on release of said screw means, said other wedge will be first disengaged, said body and said other wedge having coacting motion-limiting portions positioned to restrain the movement of said other wedge in a disengaging direction.

5. In a device of the character described, the combination with a tool body provided with angularly related bores and a transverse bore intersecting said first bores, of elements adjustable in said angularly related bores, wedges adjustable in said transverse bore in opposite directions to locking engagement with the respective elements, a screw for the manipulation of said wedges, one of said wedges comprising means for effecting a more binding frictional engagement of its element than the other wedge, whereby said other wedge will be first released, said body having a shoulder in the path of the releasing movement of said other wedge for limiting the movement thereof, whereby to force the release of the more binding wedge.

6. In a device of the character described, the combination with a tool body provided with tool-receiving bores, of tool elements adjustable in said bores, means for effecting the adjustment of said elements divergently in said bores, and a single means for clamping said elements in adjusted positions respecting said body, said body having a transverse bore intersecting said first mentioned bores, and said clamping means including wedges oppositely movable in the transverse bore into locking engagement with said elements, and a screw having threads of differing pitch engaged with the respective wedges and floated as a unit therewith in said transverse bore, one of said wedges having higher frictional binding characteristics than the other, and said body having a shoulder positioned in the path of movement of said other wedge, whereby to provide an abutment effective following the initial movement of said other wedge to enforce the subsequent release of the more binding wedge.

EDWARD HASSIG.